Aug. 22, 1967 H. O. HOVE 3,337,343

PROCESS FOR COLOR CORRECTION OF COLOR SEPARATION NEGATIVES FOR COLOR LITHOGRAPHY

Filed Nov. 5, 1962 4 Sheets-Sheet 1

INVENTOR.
HERMAN O. HOVE
BY
L. E. Carnahan

Aug. 22, 1967 H. O. HOVE 3,337,343

PROCESS FOR COLOR CORRECTION OF COLOR SEPARATION NEGATIVES FOR COLOR LITHOGRAPHY

Filed Nov. 5, 1962 4 Sheets-Sheet 2

INVENTOR.
HERMAN O. HOVE

BY

L. E. Carnahan

INVENTOR.
HERMAN O. HOVE
BY
L. E. Carnahan

Aug. 22, 1967 H. O. HOVE 3,337,343

PROCESS FOR COLOR CORRECTION OF COLOR SEPARATION NEGATIVES FOR COLOR LITHOGRAPHY

Filed Nov. 5, 1962 4 Sheets-Sheet 4

INVENTOR.
HERMAN O. HOVE

BY

L. E. Carnahan

United States Patent Office 3,337,343

Patented Aug. 22, 1967

3,337,343

PROCESS FOR COLOR CORRECTION OF COLOR SEPARATION NEGATIVES FOR COLOR LITHOGRAPHY

Herman O. Hove, Puyallup, Wash., assignor to The Boeing Company, Seattle, Wash., a corporation of Delaware Filed Nov. 5, 1962, Ser. No. 235,202

9 Claims. (Cl. 96—31)

This invention relates to apparatus and process for producing color corrected separation negatives, and more particularly to apparatus and process for producing color corrected separation negatives in which the conventional steps involving continuous tone separation negatives and positive color correction masks are eliminated.

The conventional methods of producing color corrected halftone negatives for litho printing require continuous tone materials to be used for the color separation and the color correction masking stages of the operation. Color corrected halftone negatives are then made from these color corrected continuous tone separations.

The recent proposals of the Gevaert multimask and Eastman Kodak tri-mask films are attempts to shorten the conventional methods by using one tri-layer sheet of color film to do the work that formerly required the use of three separate continuous tone masks. Except for this advance, each of these proposals still require the preparation of a set of continuous tone separation negatives and a set of continuous tone or halftone separation positives before the halftone negatives can be produced.

The instant invention has solved the problem of color correcting an uncorrected halftone separation negative by means of a halftone positive color correction mask, overcoming the problem of moire patterns of interference with the image which is introduced by too many halftone screen angles.

Briefly the invention involves apparatus and a process wherein halftone separation negatives are made directly from the original and the necessary color correction masking is then applied directly to them, thereby eliminating all the continuous tone steps in the operation.

Therefore, an object of the invention is to provide a process for producing color corrected separation negatives for color lithography.

A further object of the invention is to provide a process for color correcting an uncorrected halftone separation negative by means of a halftone positive color correction mask.

A still further object of the invention is to provide a process for producing color corrected separation negatives in which the conventional steps involving continuous tone separation negatives and positive color correction masks are eliminated.

Another object of the invention is to provide a process for producing color corrected separation negatives for color lithography which reduces costs and flow time to one-third that realized by the presently known methods.

Another object of the invention is to provide apparatus which assures perfect registration of the separation negatives and the color correction masks and aids in stripping and plate burning.

These and other objects of the invention not specifically set forth above will become readily apparent from the accompanying description and drawings in which.

Figure 1:
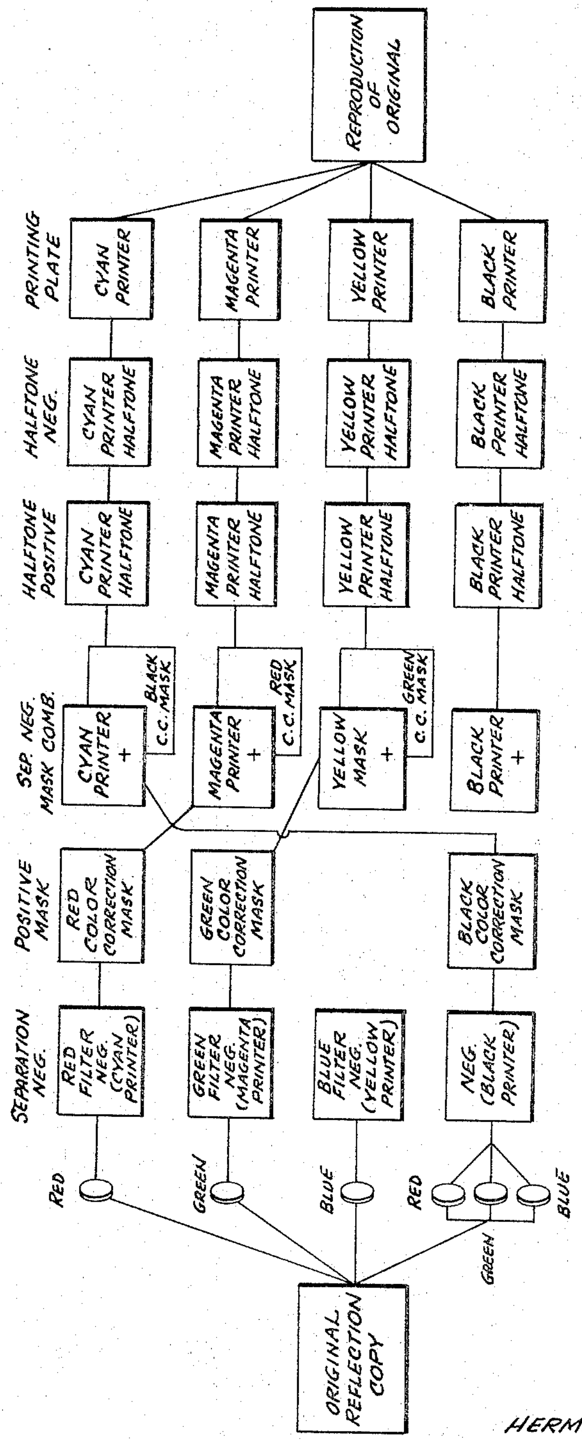
FIG. 1 is a diagram of the conventional process.
Figure 2:
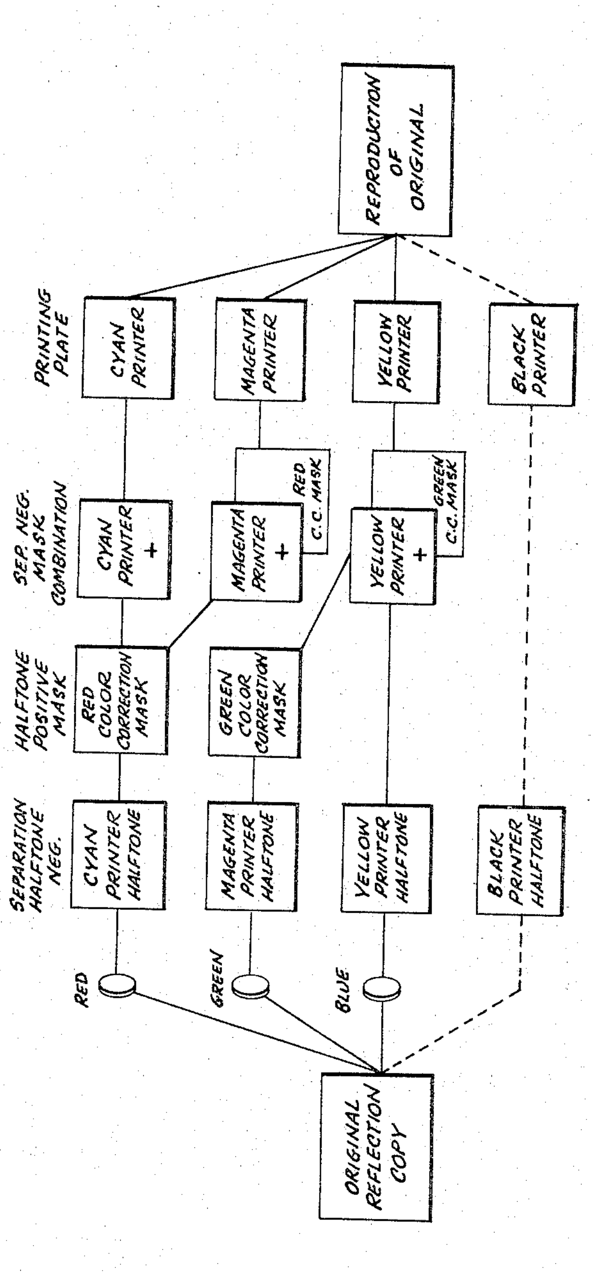
FIG. 2 is a diagram of one embodiment of the process of the present invention.
Figure 3:
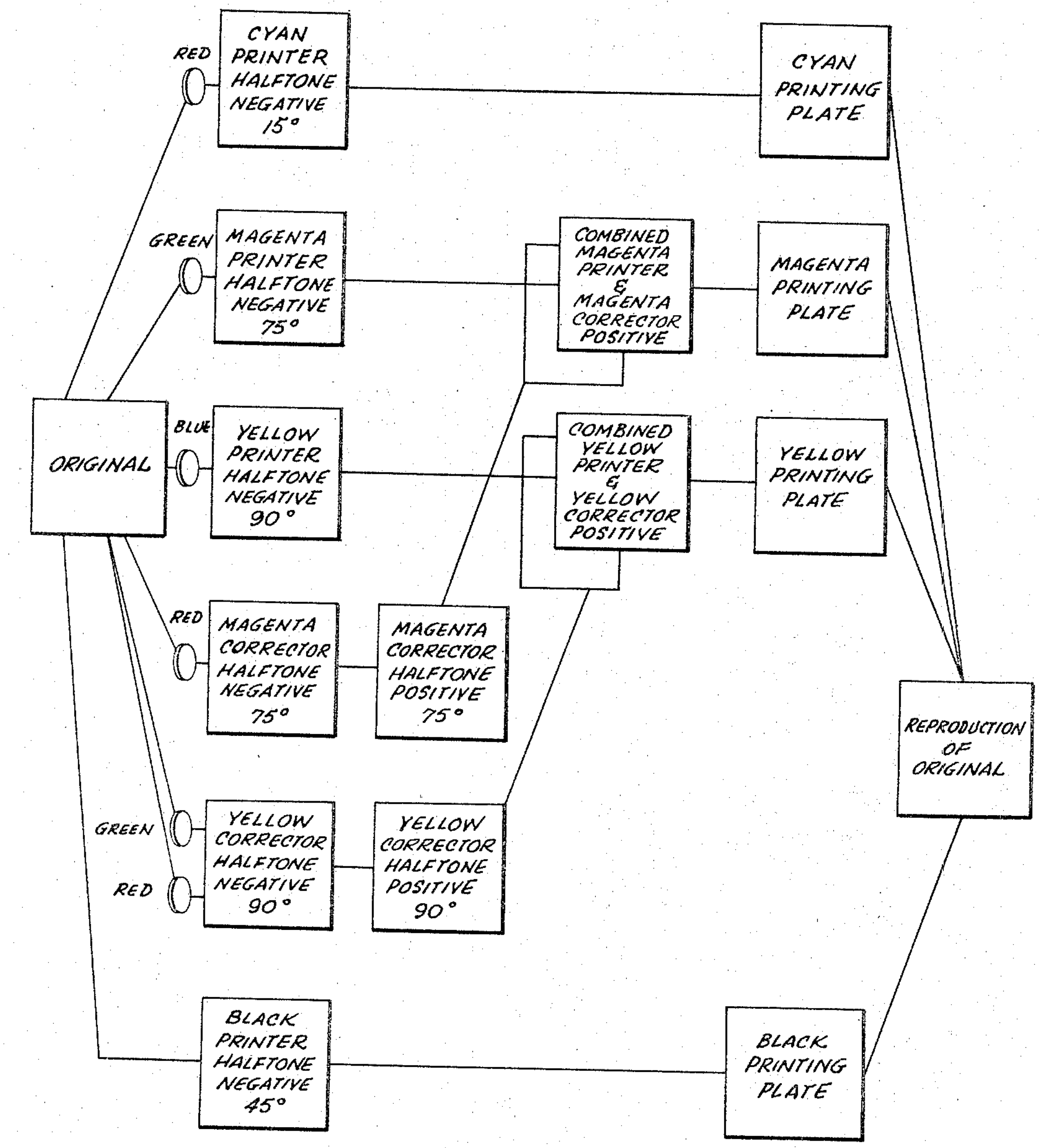
FIG. 3 is a diagram of another embodiment of the process of the present invention.

The conventional process of FIG. 1 is shown for comparison with the processes of the invention shown in FIG. 2 and FIG. 3 to clearly demonstrate the simplicity of the instant invention.

Referring now to the process diagramatically shown in FIG. 2, the process will be described in a series of steps. However, the specific sequence of steps set forth below are only for purpose of description and are no way intended to limit the process to this sequence. Furthermore, the specific type of film, the specific name brand and number of filter, the specific number of lines per inch of the master grey screen mentioned, and the screen angles used are set forth only as examples and could vary to suit the tastes, and requirements of the printer.

Description of FIG. 2 by steps:

(A) *Cyan printer.*—The cyan printer halftone negative is made by exposing EKCo (Eastman Kodak Co.) Kodalith Pan film to the original copy through a red #25 Wratten filter and a grey contact screen with rulings of 133 lines per inch, at an angle of 15° from vertical.

(B) *Magenta printer.*—The magenta printer halftone negative is made by exposing EKCo Kodalith Pan film to the original copy through a green #58 Wratten filter and a grey contact screen with rulings of 133 lines per inch, at an angle of 45° from vertical.

(C) *Yellow printer.*—The yellow printer halftone negative is made by exposing EKCo Kodalith Pan film to the original copy through a blue #47B Wratten filter and a grey contact screen with rulings of 133 lines per inch, at an angle of 75° from vertical.

(D) *Magenta printer color corrector.*—The cyan printer separation negative made in step (A) above is placed in register with a 45% screen tint master and taped in place. This registration is achieved by placing the screen rulings of the separation negative and the screen tint parallel to each other and placing each dot of the separation negative on top of the corresponding dot on the screen tint. A positive color corrector is exposed from this combination on EKCo Kodalith Ortho film (contact printed). When developed out, the positive halftone that results becomes the magenta printer corrector. The resultant screen angle is 15° from vertical, the same as the cyan printer negative from which it was exposed, and has a 45% "range" or area of dot coverage. This positive is then registered with the magenta printer and taped in place with respective screen angles which are 30° from each other.

(E) *Yellow printer color corrector.*—The magenta printer separation negative is likewise placed in register with a 45% screen tint master and exposed and processed as in step (D) above resulting in a halftone positive with a screen angle of 45° from vertical and a dot coverage of 45% that of the magenta printer. This positive is then placed in register with the yellow printer and taped in place with respective screen angles which are 30° from each other.

(F) *Offset litho plates.*—An offset litho plate is exposed and processed to the cyan printer negative; another to the combination magenta printer negative and color correction mask; and a third to the combination yellow printer negative and color correction mask.

Thus a set of 3 lithographic printing plates, color separated and color corrected, are ready for 3 color printing.

All film processing chemicals and procedures used are conventional. The percent of the screen tint of the master 45% tint mentioned may be changed to fit the needs of the varying printing presses and procedures of different plants; and in particular the reflectance properties of the process inks used. The printing press and inks used in conjunction with the process outlined above were Whitin Masterlith Duplicator Model #1115 with California Ink Co. Process Offset Inks.

If the particular job warrants the additional expense, a black printer can be added to the three color printers previously described. The addition of a black printer enhances the end result considerably in some cases. The additional steps and/or changes in the process are outlined below and indicated with dotted lines in FIG. 2.

(a) *Cyan and magenta printers.*—All steps set forth above pertaining to the cyan and magenta printers remain the same.

(b) *Yellow printer.*—The yellow printer separation halftone negative is exposed with a 90° rather than a 75° screen angle. All other previous steps remain the same for the yellow printer.

(c) *Black printer.*—The black printer separation halftone negative is exposed on EKCo Kodalith Ortho film using a white light exposure without filter through 133 line per inch master grey screen at an angle of 75° from vertical. An extreme "highlight flash" is added to the exposure so that the resultant negative image is a "skeleton" of the original.

(d) *Offset litho plates.*—The black printer separation halftone negative is exposed to a lithographic plate and added to the three previous color printers, as described above, for a four color press run.

Referring now to the process diagramatically shown in FIG. 3, the process varies from that shown in FIG. 2 primarily in the method of producing the color corrector halftone positives for the magenta and yellow halftone negatives. Again, the specific sequence of steps as outlined below and the specific examples of materials used are for the purpose of description and are not intended to be limiting. The process diagramatically shown in FIG. 3 is for full four color quality printing but can be modified to comprise only a three color process.

Description of FIG. 3 by steps:

($a^1$) *Cyan printer.*—The cyan printer halftone negative is made by exposing EKCo (Eastman Kodak Co.) Kodalith Pan film to the original copy through a red #25 Wratten filter and a grey contact screen with an angle of 15° from vertical.

($b^1$) *Magenta printer.*—The magenta printer halftone negative is made by exposing EKCo Kodalith Pan film to the original copy through a green #58 Wratten filter and a grey contact screen with an angle of 75° from vertical.

($c^1$) *Yellow printer.*—The yellow printer halftone negative is made by exposing EKCo Kodalith Pan film to the original copy through a blue #47B Wratten filter and a grey contact screen with an angle of 90° from vertical.

($d^1$) *Black printer.*—The black printer separation halftone negative is exposed on EKCo Kodalith Pan film using a white light exposure without filter through a grey contact screen with an angle of 45° from vertical. An extreme "highlight flash" is added to the exposure so that the resultant negative image is a "skeleton" of the original.

($e^1$) *Magenta corrector negative.*—The magenta corrector halftone negative is made by exposing EKCo Kodalith Pan film to the original copy through a red #25 Wratten filter using 115% of the exposure necessary to produce the cyan printer negative plus an overhead shadow flash exposure necessary to produce a 60% dot in the black areas. A grey contact screen with a 75° angle is in place during these exposures.

($f^1$) *Yellow corrector negative.*—The yellow corrector halftone negative is made by exposing EKCo Kodalith Pan film to the original copy through a green #58 Wratten filter using an exposure time necessary to produce the magenta printer negative, then a second exposure through a red #25 Wratten filter using ⅓ the exposure time necessary to produce the cyan printer negative. Also an overhead shadow flash exposure is necessary to produce a 60% dot in the black areas. A grey contact screen with a 90° angle is in place during these exposures.

($g^1$) *Magenta corrector positive.*—The magenta corrector halftone positive is made by contact printing the magenta corrector halftone negative to a sheet of EKCo Kodalith Pan film. When developed out, the positive halftone that results becomes the magenta color correction mask. This mask is then registered to the back of the magenta printer negative and taped in place.

($h^1$) *Yellow corrector positive.*—The yellow corrector halftone positive is made by contact printing the yellow corrector halftone negative to a sheet of EKCo Kodalith Pan film. When developed out the positive halftone that results becomes the yellow color correction mask. This mask is then registered to the back of the yellow printer negative and taped in place.

($i^1$) *Offset litho plates.*—An offset litho plate is exposed and processed to the cyan printer negative; a second plate to the combination magenta printer negative and color correction mask; a third plate to the combination yellow printer negative and color correction mask; and a fourth plate to the black printer negative.

Thus a set of 4 lithographic printing plates, color separated and color corrected, are ready for 4 color printing.

The number of lines per inch of the grey contact screen could vary to suit the tastes and requirements of the printer. The exposures necessary to produce the magenta and yellow corrector negatives may be changed to fit the needs of the varying printing presses and procedures of different plants; and in particular the reflectance properties of the process inks used.

As set forth above, th process shown in FIG. 3 can be modified to comprise only a three color process, this being accomplished by changing the angle for making the yellow printer halftone negative (step ($c^1$)) from 90° to 45° from vertical and by utilizing a grey contact screen with a 45° angle instead of a 90° angle in making the yellow corrector halftone negative (step ($f^1$)) and eliminating the steps pertaining to the black printer.

The portion (steps ($e^1$) through ($h^1$) set forth above) of the process shown in FIG. 3 pertaining to producing the color correctors can be modified as follows:

($e^{11}$) *Magenta corrector negative.*—The magenta corrector halftone negative is made by exposing EKCo Kodalith Pan film to the original copy through a red #25 Wratten filter using an exposure time necessary to produce the cyan printer negative, then a second exposure through a blue #47B filter using ⅓ the exposure time necessary to produce the yellow printer negative. A grey contact screen with a 75° angle is in place during these exposures.

($f^{11}$) *Yellow corrector negative.*—The yellow corrector halftone negative is made by exposing EKCo Kodalith Pan film to the original copy through a green #58 Wrattten filter using the exposure time necessary to produce the magenta printer negative, then a second exposure through a red #25 Wratten filter using ⅓ the exposure time necessary to produce the cyan printer negative. A grey contact screen with a 90° angle is in place during these exposures.

($g^{11}$) *Magenta corrector positive.*—The magenta corrector halftone negative made in step ($e^{11}$) above is placed in register with a 40% screen tint master made from 75° screen and taped in place. A positive color corrector is exposed from this combination on EKCo Kodalith Ortho film (contact printed). When developed out, the positive halftone that results becomes the magenta printer corrector. The resultant screen angle is 75° from vertical, the same as the magenta printer negative for which it was exposed, and has a 40% area of dot coverage. This positive is then registered with the magenta printer negative and taped in place.

($h^{11}$) *Yellow corrector positive.*—The yellow corrector halftone negative is likewise placed in register with a 40% screen tint master made from 90° screen and exposed and processed as in step ($g^{11}$) above resulting in a halftone positive with a screen angle of 90° from vertical and a dot coverage of 40% of the yellow corrector. This positive is then placed in register with the yellow printer negative and taped in place.

The percent of the screen tint of the master 40% tint and the exposures necessary to produce the magenta and yellow corrector negatives may be changed to fit the needs of the varying printing presses and procedures of different plants; and in particular the reflectance properties of the process inks used.

The following is set forth to give a more detailed explanation of the process diagrammatically shown in FIG. 3 and wherein the original reproduced was a reflection copy.

The equipment and material used are as follows:

(1) Copy camera with a vacuum pin register back;

(2) Incandescent (Color Tran) light source for copy board;

(3) Point source light over copy camera film back for shadow flash exposures;

(4) Set of 4 Caprock 150 line grey contact screens having 15°, 45°, 75° and 90° angles pre-punched for pin registration;

(5) Eastman Kodak Co. Kodalith Pan estar base film, pre-punched for pin registration.

Figure 4:
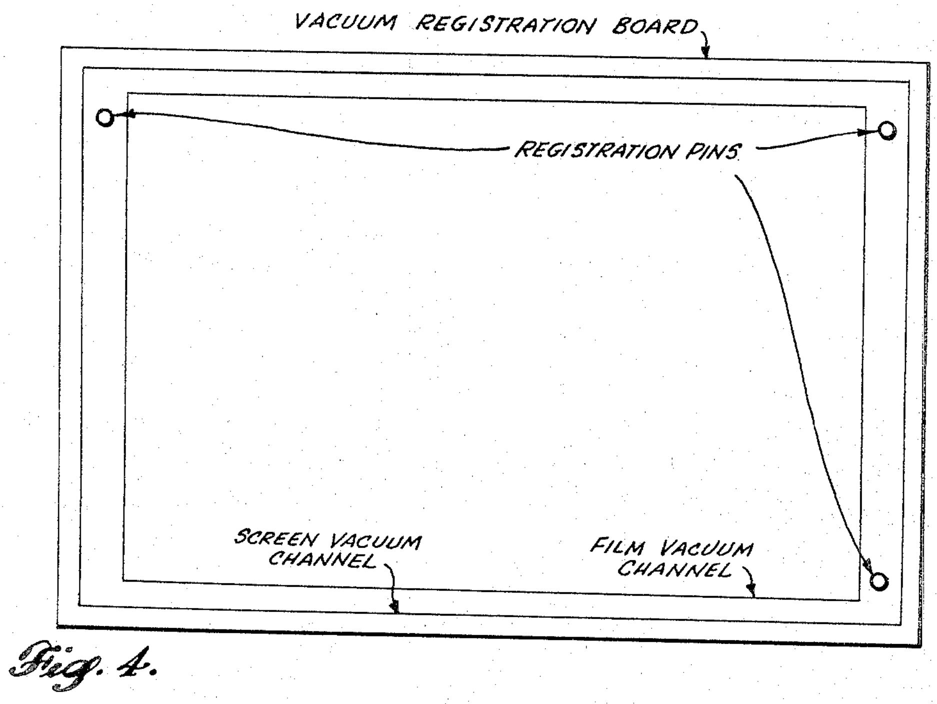
FIG. 4 shows a vacuum registration board for aligning the film, screens, negatives and correction masks.
Figure 5:
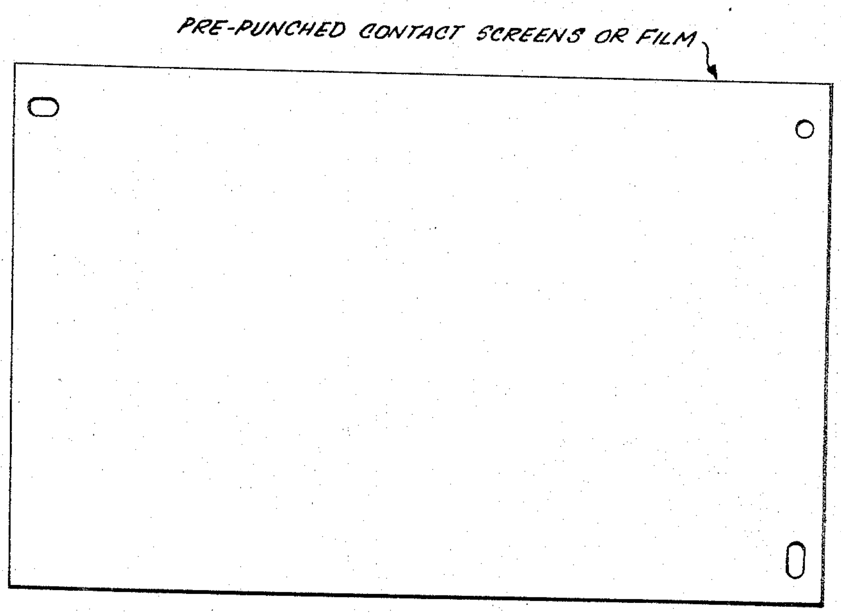
FIG. 5 shows an embodiment of pre-punching for the contact screens and film for the vacuum registration board.

The film and screens are pre-punched as shown in FIG. 5 and are used in conjunction with the vacuum pin registration board shown in FIG. 4 during all the exposure steps in order to assure perfect registration of the separation negatives and the color correction masks and as an aid in stripping and plate burning. A pin registration board of the FIG. 4 type is located in the camera back and another positioned on a work table for reasons described hereinafter. While the pins in FIG. 4 have each been shown circular, two of said pins may be made in an elongated shaped similar to the pre-punched holes of FIG. 5. However, two of the slots of the screen and film should be longer than their respective pins in the registration board to allow for expansion and contraction.

The processing chemicals used were the standard A and B developer recommended for Kodalith type film and the standard short stop and fixing chemicals.

The reflection copy was placed in a copy board together with a calibrated reflectance grey scale and a set of color control patches consisting of the primary colors, the process ink colors, three color brown, white and black. The grey scale was used as an aid in exposure control. The color control patches were an aid in proper color correction masking.

The reproduction was to be a 50% reduction from the original so a diaphragm setting of 50% on the F–11 scale was used for the lens opening. This remained the same for all the negative exposures. The process was performed as outlined below.

(1) The shadow flash exposure on all the printer negatives and corrector negatives was given in this manner. The copy camera film back was swung down to the horizontal position with the vacuum on and the contact screen in place. The exposing light, which was located 8 feet above the film back, consisted of a 6 watt lamp with a .50 Neutral Density filter in place.

(2) The cyan printer negative was exposed using a Wratten #25 plus .50 Neutral Density filter over the lens. A sheet of Kodalith Pan film was placed emulsion up over the vacuum registration pins in the camera back. The grey contact screen having the 15° screen angle was then placed emulsion down over the camera registration pins. The basic exposure to the copy was 14 seconds followed by a 4 second shadow exposure to the overhead white light (as in #1 above).

(3) The magenta printer negative was exposed using a Wratten #58 filter over the lens. A sheet of Kodalith Pan film was placed emulsion up over the vacuum registration pins of the camera and the grey contact screen having the 75° screen angle was then placed emulsion down over said camera registration pins. The basic exposure to the copy was 17 seconds followed by a 4 second shadow exposure to the overhead white light (as in #1 above).

(4) These two sheets of Kodalith film were then processed together, back to back, in a tray of A and B developer. Rapid and constant tumbling agitation was used throughout the 2½ minute development time. This same agitation was carried through into the stop bath and fixing bath.

(5) The yellow printer negative was exposed using a Wratten #47B filter over the lens. A sheet of Kodalith Pan film was placed emulsion up over the camera vacuum registration pins. The grey contact screen having the 90° screen angle was then placed emulsion down over said vacuum registration pins. The basic exposure to the copy was 80 seconds followed by a 4 second shadow exposure to the overhead white light (as in #1 above).

(6) The black printer negative was exposed using no filter over the lens. A sheet of Kodalith Pan film was placed emulsion up over the camera vacuum registration pins. The film was then given a 1½ second exposure to the copy through the lens. Then the grey contact screen having the 45° screen angle was placed emulsion down over said registration pins. The basic exposure to the copy was 8 seconds followed by a 4 second shadow exposure to the overhead white light (as in #1 above).

(7) These two sheets of Kodalith film were then processed together as in #4 above.

(8) The cyan, magenta and yellow printer negatives had identical contrast ranges. They had a 90% dot in the white highlight areas, which corresponded to the .00 step on the reflectance grey scale, and a 10% dot in the shadow areas which corresponded to the 1.90 step in the grey scale. The .70 step in the grey scale had a 50% dot. The black printer negative had a 50% dot in the 1.90 step in the grey scale and was completely blocked from the .70 step on up.

(9) The magenta corrector negative was exposed using a Wratten #25 filter plus .50 Neutral Density over the lens. A sheet of Kodalith Pan film was placed emulsion up over the vacuum registration pins. The grey contact screen having the 75° screen angle was then placed emulsion down over said vacuum registration pins. The basic exposure to the copy was 16 seconds followed by a 15 second shadow exposure to the overhead white light (as in #1 above).

(10) The yellow corrector negative was exposed using a split exposure through two filters, the Wratten #58 and the Wratten #25 plus .50 Neutral Density. A sheet of Kodalith Pan film was placed emulsion up over the camera vacuum registration pins. The grey contact screen having the 90° screen angle was then placed emulsion down over said vacuum registration pins. The basic exposure to the copy was 17 seconds through the #58 filter then 4½ seconds through the #25 filter plus .50 Neutral Density. This was followed by a 15 second shadow exposure to the overhead white light (as in #1 above).

(11) These two sheets of Kodalith film were then processed together as in #4 above.

(12) The magenta corrector negative and the yellow corrector negative both had the same contrast range. They had a 90% dot in the .20 step of the grey scale and a 55%–60% dot in the 1.90 step of the grey scale.

(13) The magenta corrector positive was made by placing a sheet of Kodalith Pan film emulsion up over the camera vacuum registration pins. Next the magenta corrector negative was placed emulsion up over the vacuum registration pins. Next a sheet of clear acetate was placed down over said vacuum registration pins to hold the two films in place. It was then exposed to the overhead white light for 10 seconds.

(14) The yellow corrector positive was made by placing a sheet of Kodalith Pan film emulsion up over the camera vacuum registration pins. Next the yellow corrector negative was placed emulsion up over the vacuum registration pins. Next a sheet of clear acetate was placed down over the vacuum registration pins to hold the two sheets of film in place. It was then exposed to the overhead white light for ten seconds.

(15) These two exposed sheets of Kodalith film were then processed together as in #4 above.

(16) After the color corrector positives were dried, the magenta printer negative was placed emulsion down over set of registration pins of a registration board positioned on a light table. The magenta color corrector positive was then placed face down over said pins and taped in place on the back of the negative. The dots in a correctly made magenta corrector positive will fill and cancel out the corresponding open dots in the cyan and green areas of the color control patches in the magenta printer negative.

(17) The yellow corrector positive was then registered and taped to the back of the yellow printer negative by the use of the table register pins. The dots in a correctly made yellow corrector positive will fill and cancel out the corresponding open dots in the violet and cyan areas of the color control patches in the yellow printer negative.

(18) 3M type "R" photo offset plates were then burned from (1) the cyan printer negative, (2) the magenta printer negative with its color correction mask in place, (3) the yellow printer negative with its color correction mask in place, (4) the black printer negative.

(19) These plates were printed on a Royal Zenith Press with California Ink Co. process offset inks.

Color transparencies are reproduced in the same manner either by the use of a high intensity light source, enlarger or by backlighting the transparency in a copy camera copy holder. The only change necessary is to add a contrast reducing silver mask to the back of the transparency to reduce its contrast range to approximately 1.30.

The average color transparency with a contrast range of 1.80 requires a contrast reducing mask with a contrast range of .50. When this mask is registered to the back of the color transparency it will reduce the contrast range of the color transparency to 1.30.

The contrast reducing silver mask is made by contact printing the color transparency onto a sheet of Eastman Kodak Company separation negative Plastic Base film. A 15 watt lamp with a Wratten 2B filter, in place 6 feet above the contact print frame, is used for exposure. The average exposure is for 2 seconds followed by development for 2¾ minutes in DK–50, mixed 1 part developer to 3 parts water.

Thus the invention provides apparatus and process for producing color corrected separation negatives in which the conventional steps involving continuous tone separation negatives and positive color correction masks are eliminated.

The apparatus and process described herein has proven its advantages over accepted known processes in two specific areas; namely material-labor savings and decreased flow time. A set of four color separation press plates can be completed with the expenditure of one-third the man-hours of labor and less than half the materials by using this process as compared with accepted conventional methods. This process reduces costs and flow time to one-third that realized by most short run color printing plants.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim is:

1. A process for producing color separated and color corrected lithographic printing plates comprising the steps of making halftone negatives for cyan, magenta and yellow printer; making magenta and yellow halftone color corrector positives; masking the magenta printer negative with the magenta corrector positive; masking the yellow printer negative with the yellow corrector positive; and exposing separate litho plates to each the cyan printer negative, the color corrector masked magenta printer negative, and the color corrector masked yellow printer negative, the magenta halftone color corrector positive being made by positioning the cyan halftone negative in register with a screen tint master, and exposing this combination to film; and the yellow halftone color corrector positive being made by positioning the magenta halftone negative in register with a screen tint master, and exposing this combination to film.

2. A process for producing color separated and color corrected lithographic printing plates comprising the steps of making halftone negatives for cyan, magenta and yellow printer; making magenta and yellow halftone color corrector positives; masking the magenta printer negative with the magenta corrector positive; masking the yellow printer negative with the yellow corrector positive; and exposing separate litho plates to each the cyan printer negative, the color corrector masked magenta printer negative, and the color corrector masked yellow printer negative, the magenta halftone color corrector positive being made by producing a corrector halftone negative by exposing film to an original through a red filter with 115% exposure time necessary to produce the cyan printer negative, exposing the film to another type exposure, each of the exposures being made with grey contact screen at an angle of 75° from vertical, and making the halftone positive from this combination; the yellow halftone color corrector positive being made by producing a corrector halftone negative by exposing film to the original through a green filter with exposure time necessary to produce the magenta printer negative, exposing the film through a red filter with ⅓ the exposure time necessary to produce the cyan printer negative exposing the film to another type exposure, each of the exposures being made with grey contact screen at an angle of 90° from vertical, and making the halftone positive from this combination.

3. The process defined in claim 2 wherein each said another type exposure comprises an overhead shadow flash to produce a 60% dot in the black areas.

4. A process for producing color separated and color corrected lithographic printing plates adapted for the reproduction of an original comprising the steps of making screened separation negatives for cyan, magenta and yellow printers; making a screened positive color corrector for the magenta negative by placing a screened cyan negative in register with a screen tint master and exposing a film to the combination; making a screened positive color corrector for the yellow negative by placing a screened magenta negative in register with a screen tint master and exposing a film to the combination; masking the screened magenta printer negative with the screened magenta corrector positive; masking the screened yellow printer negative with the screened yellow corrector positive; and exposing separate litho plates to each of the cyan printer negative, the color corrector masked magenta printer negative, and the color corrector masked yellow printer negative.

5. The process defined in claim 4 including the additional steps of making a screened black printer negative and exposing a litho plate to the black printer negative.

6. A process for producing color separated and color corrected lithographic printing plates adapted for the reproduction of an original comprising the steps of making screened separation negatives for cyan, magenta and yellow printers, making a magenta corrector screened negative by exposing film to an original through a red filter with the exposure time greater than that necessary to produce the cyan printer negative, exposing said film to an overhead shadow flash to produce a 60% dot in the black areas, each exposure being made with grey contact screen, and exposing a film to this combination to produce a screened magenta corrector positive; making a yellow corrector screened negative by exposing film to the original through a green filter with the exposure time necessary to produce the magenta printer negative, exposing said film through a red filter using less than the exposure time necessary to produce the cyan printer negative, exposing said film to an overhead shadow flash to produce a 60% dot in the black areas, each exposure being made with grey contact screen, and exposing a film to this combination to produce a screened yellow corrector positive; masking the screened magenta printer negative with the screened magenta corrector positive; masking the screened yellow printer negative with the screened yellow corrector positive; and exposing separate litho plates to each of the cyan printer negative, the color corrector masked magenta printer negative, and the color corrector masked yellow printer negative.

7. A process for color correction of halftone magenta and yellow separation negatives comprising the steps of placing a cyan separation halftone negative in register with a screen tint master, making a halftone color corrector positive from such combination, and masking a magenta separation halftone negative with the halftone corrector positive; and placing a magenta separation halftone negative in register with a screen tint master, making a halftone color corrector positive from such combination, and masking a yellow separation halftone negative with the halftone corrector positive.

8. A process for color correction of haltone magenta and yellow separtion negatives comprising the steps of making a magenta corrector halftone negative by exposing film to an original through a red filter with the exposure time necessary to produce a cyan printer negative, exposing the film through a blue filter using ⅓ the exposure time necessary to produce the yellow printer negative, each exposure being made through a grey contact screen, placing the corrector negative in register with a screen tine master, and exposing a film to this combination to produce a magenta corrector halftone positive; making a yellow corrector halftone negative by exposing film to the original through a green filter with the exposure time necessary to produce the magenta printer negative, exposing the film through a red filter using ⅓ the exposure time necessary to produce the cyan printer negative, each exposure being made through a grey contact screen, placing the corrector negative in register with a screen tint master, and exposing a film to this combination to produce a yellow corrector halftone positive; masking the halftone magenta printer negative with the halftone magenta corrector positive; and masking the halftone yellow printer negative with the halftone yellow corrector positive.

9. A process for producing color separated and color corrected lithographic printing plates adapted for the reproduction of an original comprising the steps of making halftone separation negatives for cyan, magenta, yellow and black printers; making a magenta corrector halftone negative by exposing film to an original through a red filter with 115% the exposure time necessary to produce the cyan printer negative, and exposing said film to an overhead shadow flash, each exposure being made with a 75° angle grey contact screen; making a yellow corrector halftone negative by exposing film to the original through a green filter with exposure time necessary to produce the magenta printer negative, exposing said film through a red filter using ⅓ the exposure time necessary to produce the cyan printer negative, and exposing said film to an overhead shadow flash, each exposure being made with 90° angle grey contact screen, making a magenta color corrector halftone positive by contact printing said magenta corrector halftone negative to film; making a yellow color corrector halftone positive by contact printing said yellow corrector halftone negative to film; masking said magenta printer halftone negative with said magenta color corrector halftone positive; masking said yellow printer halftone negative with said yellow color corrector halftone positive; and exposing a lithographic plate to the cyan printer negative, another plate to the color corrector masked magenta printer negative, another plate to the color corrector masked yellow printer negative, and another plate to the black printer negative.

References Cited

UNITED STATES PATENTS

| | | | |
|---|---|---|---|
| 2,099,364 | 11/1937 | Hunter | 96—30 |
| 2,165,407 | 7/1939 | Murray | 96—30 |
| 2,567,240 | 9/1951 | Sites | 96—5 |
| 2,701,196 | 2/1955 | Conrad | 96—5 |
| 2,740,323 | 4/1956 | Borth et al. | 96—30 |
| 2,841,492 | 7/1958 | Gresham | 96—30 |
| 3,000,737 | 9/1961 | Barnhart | 96—30 |
| 3,085,878 | 4/1963 | Archer | 96—30 |
| 3,160,096 | 12/1964 | Norton | 96—30 |

OTHER REFERENCES

Jaffe: "Color Separation Photography for Offset Lithography," pages 14–30, 52–56, 61–63, 75–95, 119–121, 172–174, 184–197, Lithographic Technical Foundation, Inc., 131 E. 39th St., New York 16, N.Y. (1959).

Jaffe: "Halftone Photograph for Offset Lithography," pages 171–177, Lithographic Technical Foundation, Inc., 131 E. 39th St., New York 16, N.Y. (1960).

Waltwin: "The Lithographers Manual," vol. 1, pages 7:21–7:26 and 7:50–7:52, Waltwin Publishing Co., 317 W. 45th St., New York 36, N.Y. (1958).

NORMAN G. TORCHIN, *Primary Examiner.*

J. TRAVIS BROWN, *Examiner.*